J. A. BRADBURN.
PROCESS OF OBTAINING MAGNESIA.
APPLICATION FILED NOV. 28, 1914.
1,156,662.
Patented Oct. 12, 1915.
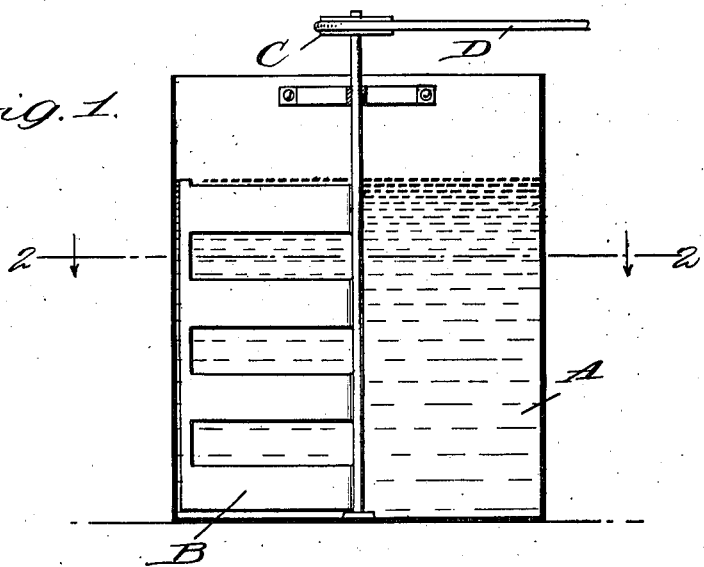
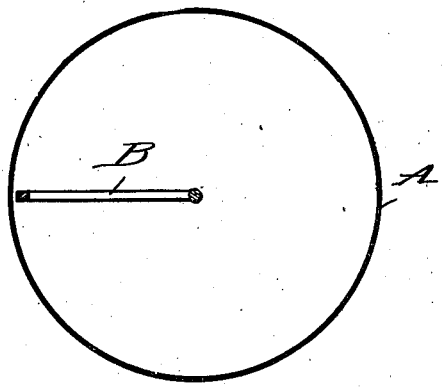
WITNESSES
F. E. Barry
H. E. Beck
INVENTOR
Joseph A. Bradburn
BY Munn & Co.
ATTORNEYS

UNITED STATES PATENT OFFICE.

JOSEPH A. BRADBURN, OF SYRACUSE, NEW YORK.

PROCESS OF OBTAINING MAGNESIA.

1,156,662.  Specification of Letters Patent.  Patented Oct. 12, 1915.

Application filed November 28, 1914. Serial No. 874,424.

*To all whom it may concern:*

Be it known that I, JOSEPH A. BRADBURN, a citizen of the United States, and a resident of Syracuse, in the county of Onondaga and State of New York, have made certain new and useful Improvements in Processes of Obtaining Magnesia, of which the following is a specification.

My invention relates to improvements in methods or processes of obtaining magnesia from dolomite or dolomitic limestone, and it consists in the various steps hereinafter enumerated and particularly pointed out in the appended claims.

An object of my invention is to provide a process by means of which magnesia may be economically produced.

A further object of my invention is to provide a process which will produce a relatively pure magnesia, in that it does not contain other deleterious substances.

Other objects and advantages will appear in the following specification, and the novel features of the invention will be particularly pointed out in the appended claims.

My invention is illustrated in the accompanying drawings forming part of this application in which—

Figure 1 is a section through a tank which may be used with this process, and Fig. 2 is a section along the line 2—2 of Fig. 1.

It will be understood that the drawings are merely for explaining the process, but that the process is not at all dependent upon any particular form of apparatus but may be carried out by any suitable apparatus.

The raw material, as stated above, is dolomite a natural double carbonate of calcium and magnesium or dolomitic limestone. This is first calcined at a temperature not higher than is necessary to decompose the calcium carbonate and the magnesium carbonate. The calcined material is then placed in a tank, such as the tank A shown in the drawings, and water is added. The mixture is then stirred with a stirrer, such as that shown at B, which may be operated by any suitable power, as by drive pulleys C and belt D. This stirrer is kept in motion so as to keep the solid and liquid parts of the "milk", which is formed, thoroughly mixed. The mixture is kept in the tank from one to three days or long enough to secure a sufficiently complete hydration of the dolomitic calcium and magnesium $CaH_2O_2$ $MgH_2O_2$. If the temperature of calcination is kept about 800° C. the product will be practically hydrated in twenty-two to seventy-four hours. The dolomitic "milk" thus prepared is mixed with a solution of sodium and ammonium chlorids, NaCl AmCl containing in one liter about 60 to 90 grams NaCl and about 120 to 180 grams AmCl. A liquor of this combination is made in the manufacture of soda by the ammonia process. Such a quantity of this solution is used as will convert the $CaH_2O_2$ $MgH_2O_2$ of the dolomitic milk to $CaCl_2$ $MgCl_2$ and leave some AmCl unchanged. The latter is then distilled in a suitable apparatus to obtain the liberated ammonia which may be used for any suitable purpose and a residual liquor containing calcium chlorid, magnesium chlorid and sodium chlorid. A small excess of ammonium chlorid is maintained in the liquor being distilled until near the end of the distillation to insure that all available calcium and magnesium shall be converted to calcium chlorid and magnesium chlorid, then near the end of the distillation enough of the milk of calcined dolomite is added to decompose the remaining ammonium chlorid and the distillation is continued until the liquor is free from ammonia.

The residual liquor from the distillation which contains calcium chlorid, magnesium chlorid and sodium chlorid is settled or filtered to obtain a clear liquor. To this liquor is added either a milk of calcined dolomite which may be completely hydrated or not, or calcined dolomite in a dry powdered form, or any or all of these. The quantity of any or all of these so taken is such as shall contain sufficient CaO or $CaH_2O_2$ to decompose the magnesium chlorid present and precipitate its magnesium in the form of magnesium hydrate ($MgH_2O_2$) without introducing an unnecessary excess of lime. The magnesium oxid in the added calcined dolomite does not enter into the reaction but is also precipitated with the magnesium hydrate coming from the magnesium chlorid. During the precipitation the liquor is heated and agitated. The following represents the chemical reactions:

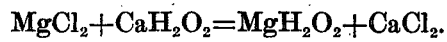
$$MgCl_2 + CaH_2O_2 = MgH_2O_2 + CaCl_2.$$

The liquid with its precipitate is caused to flow through a settling tank or a series of settling tanks in which the comparatively heavy magnesium oxid collects near the inlet while the outgoing stream of liquor carries along with it the comparatively light weight magnesium hydrate. The magnesium hydrate is filtered out of the liquor, then washed free from magnesium chlorid and sodium chlorid, after which it may be dried and used for any suitable purpose. The magnesium oxid is also collected out of the liquor by a filter or otherwise (by running out the liquor from near the inlet of the tank) then washed free from the chlorids of calcium and sodium, after which it may be dried and used for any suitable purpose. Magnesia is obtained by calcining the magnesium hydrate.

As a modification of the process the milk of calcined dolomite before going through the hydrating tanks may be at once mixed with the sodium chlorid and ammonium chlorid liquor and the whole either passed through the distilling operation or first passed through the hydrating tanks and thence to the distilling operation.

A further modification is to take the dry powdered calcined dolomite and add it to the sodium chlorid ammonium chlorid liquor and then pass the latter directly to the distilling operation or first through the hydrating tanks and thence to the distilling operation.

I claim:—

1. The herein described process of producing magnesia from a dolomitic substance containing carbonate of calcium and magnesium, which consists in calcining said substances at a temperature not higher than necessary to decompose the calcium carbonate and magnesium carbonate, treating the calcined product with water to form a milk, stirring the same until hydration is sufficiently complete, mixing the milk thus prepared with a solution of sodium and ammonium chlorids, distilling the solution thus treated to free the same from ammonia, treating the residual solution with calcined dolomite whereby magnesium hydrate is precipitated from the solution and magnesium oxid is separated from the calcined dolomite, collecting the magnesium hydrate and the magnesium oxid each separately from the liquor, and calcining the magnesium hydrate.

2. The herein described process of producing magnesia from a dolomitic substance containing carbonate of calcium and magnesium, which consists in calcining said substances, treating the calcined product with water to hydrate the same, mixing the hydrated solution with a solution of sodium and ammonium chlorids, distilling the solution to free the same from ammonia, treating the residual solution with calcined dolomite whereby magnesium hydrate is precipitated from the solution and magnesium oxid is separated from the calcined dolomite, collecting the magnesium hydrate and the magnesium oxid each separately from the liquor, and calcining the magnesium hydrate.

3. The herein described step in the process of producing magnesia from a dolomitic substance, which consists in treating calcined dolomite with a liquor containing calcium chlorid, sodium chlorid, and magnesium chlorid, in sufficient quantities to precipitate magnesium hydrate and separate magnesium oxid.

JOSEPH A. BRADBURN.

Witnesses:
C. W. ANNABLE,
A. ANNABLE.